US008199890B2

(12) United States Patent
Pirzada

(10) Patent No.: US 8,199,890 B2
(45) Date of Patent: Jun. 12, 2012

(54) CAMP ON LOCATION

(75) Inventor: Shamim S. Pirzada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1528 days.

(21) Appl. No.: 11/671,919

(22) Filed: Feb. 6, 2007

(65) Prior Publication Data

US 2008/0186198 A1 Aug. 7, 2008

(51) Int. Cl.
*H04M 11/00* (2006.01)

(52) U.S. Cl. .................................. 379/93.02; 379/207.1

(58) Field of Classification Search ................ 379/209.01–218.01, 93.02, 207.1
See application file for complete search history.

(56) References Cited

U.S. PATENT DOCUMENTS 5,260,986 A 11/1993 Pershan
5,657,007 A * 8/1997 Anderson et al. ............. 340/904
6,160,881 A * 12/2000 Beyda et al. ............. 379/209.01
6,298,039 B1 * 10/2001 Buskens et al. ............... 370/216
6,335,679 B1 * 1/2002 Thomas et al. .......... 340/426.13
6,473,437 B2 * 10/2002 Stumer ......................... 370/462
6,492,912 B1 * 12/2002 Jones ............................ 340/994
6,529,587 B1 * 3/2003 Cannon et al. ............. 379/88.18
6,560,318 B1 * 5/2003 Spielman et al. .......... 379/88.12
6,639,516 B1 * 10/2003 Copley ....................... 340/573.4
7,010,110 B2 * 3/2006 Jorasch et al. ........... 379/207.04
7,129,818 B1 * 10/2006 Begole et al. ............ 340/286.02
7,443,915 B2 * 10/2008 Standish et al. .............. 375/257
7,680,263 B2 * 3/2010 Nice et al. ................ 379/265.04
2001/0006519 A1 * 7/2001 Voit .............................. 370/352
2003/0005133 A1 * 1/2003 Banerjee et al. .............. 709/229
2003/0055994 A1 3/2003 Hermann et al.
2004/0164867 A1 8/2004 Jormalainen
2005/0064861 A1 * 3/2005 Nishida ......................... 455/420
2006/0165058 A1 7/2006 Caballero-McCann et al.
2006/0227949 A1 * 10/2006 Shaffer et al. ............ 379/142.14
2006/0239200 A1 10/2006 Pirzada et al.
2007/0121878 A1 * 5/2007 Shaffer et al. ............ 379/215.01
2007/0287415 A1 * 12/2007 Yamada ........................ 455/406

FOREIGN PATENT DOCUMENTS

WO WO02080113 A 10/2002
WO 2422937 A 8/2006

* cited by examiner

*Primary Examiner* — Simon Sing
*Assistant Examiner* — Assad Mohammed
(74) *Attorney, Agent, or Firm* — P. Su

(57) ABSTRACT

In one embodiment, a method includes obtaining a request for a notification regarding an event associated with a first party and a first location. The request is received or otherwise obtained from a second party. The method also includes determining whether the second party is permitted to receive the notification, determining whether the event has occurred, sending the notification if the event has occurred and the second party is permitted to receive the notification. Sending the notification regarding the event includes sending the notification to the second party.

21 Claims, 7 Drawing Sheets

CAMP ON LOCATION

BACKGROUND OF THE INVENTION

The ability to determine the presence of individuals relative to a location is often desirable. For instance, it may be desirable for subordinates to determine when their supervisor is in his or her office, e.g., so that they may speak with the supervisor. To locate their supervisor, subordinates may periodically walk past the office of the supervisor to determine whether he or she is in the office. While periodically checking the office of the supervisor is generally effective in allowing the presence of the supervisor to be determined, periodically checking the office may be relatively inefficient.

Rather than periodically checking the office of the supervisor to determine whether he or she is present, subordinates may instead attempt to contact the supervisor. By way of example, subordinates may e-mail or leave a telephone message for the supervisor requesting that the supervisor contact them when he or she arrives. However, the supervisor may not necessarily check his or her e-mail or telephone messages substantially immediately upon arrival at his or her office. Hence, the subordinates may not be aware of the presence of the supervisor in his or her office until relatively long after the supervisor has arrived.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes obtaining a request for a notification regarding an event associated with a first party and a first location. The request is received or otherwise obtained from a second party. The method also includes determining whether the second party is permitted to receive the notification, determining whether the event has occurred, sending the notification if the event has occurred and the second party is permitted to receive the notification. Sending the notification regarding the event includes sending the notification to the second party.

Description

A system which monitors a location and is capable of identifying parties that are present at the location may provide notification relating to the presence of the parties. In one embodiment, a user of the system may effectively request notification when there is a transition or event, e.g., an arrival or a departure, of a first party relative to the location. The user may effectively "camp" on the location such that the location may be monitored for the transition associated with the first party. By way of example, a user, or "camper," may request that the system notify him or her when the first party, or "campee," arrives at the location.

The ability to camp on a location increases the efficiency with which the presence of a party relative to the location may be determined. When a user camps on a location, the user is substantially automatically notified relatively soon after the presence of the party relative to the location changes. Hence, the user may be made aware of whether the party has arrived or left the location without having to actually check the location, or having to waiting for the party to respond to a request, e.g., an e-mail request or a request left in a telephone message.

Figure 1A:
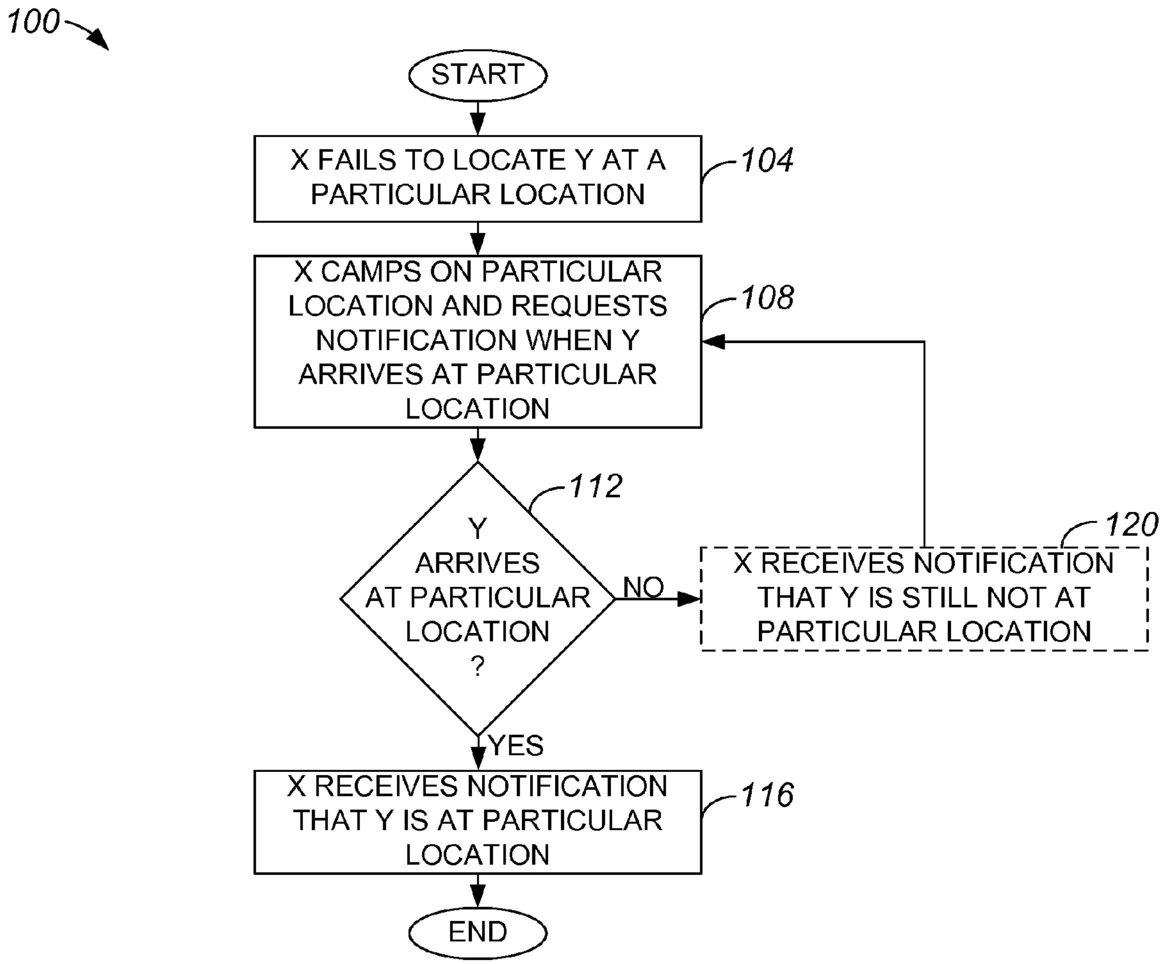
FIG. 1A is a process flow diagram which illustrates a method of camping on a location for an arrival at the location in accordance with an embodiment of the present invention.

A user may typically use a system to camp on a location to determine when a party either arrives or leaves the location. Referring initially to FIG. 1, a process of camping on a location for notification regarding the arrival of a party at a particular location will be described in accordance with an embodiment of the present invention. A process 100 of camping on a location begins at step 104 in which a party, e.g., party X, fails to locate another party, e.g., party Y, at a particular location. When X does not locate Y at the particular location, X camps on the particular location in step 108, and requests notification when Y arrives at the particular location. Camping on the particular location may include executing a camping application that allows a method of notification to be specified, as will be described below with reference to FIG. 4.

After X camps on the particular location, it is determined in step 112 whether Y has arrived at the particular location. The determination of whether Y has arrived at the particular location may occur, in one embodiment, when periodical polls of the location by the camping application indicate that Y has arrived at the particular location. Alternatively, the determination of whether Y has arrived at the particular location may occur when the camping application receives an indication that Y has arrived at the particular location, as for example from a sensor location at the particular location.

If the determination in step 112 is that Y has not arrived at the particular location, then in optional step 120, X receives notification from the camping application that Y has still not arrived at the particular location. From step 120, process flow returns to step 108 in which X continues camping on the particular location. It should be appreciated that in the absence of optional step 120, process flow may move directly from step 112 to 108 if it is determined that Y has not arrived at the particular location.

Alternatively, if it is determined in step 112 that Y has arrived at the particular location, X is notified of the arrival of Y in step 116. A notification of the arrival may be provided to X by a camping application, and may include, but is not limited to, a notification that is provided via e-mail, a notification that is provided via telephonic communications, and/or a notification that is provided via an instant message on an instant messaging application. Once X receives notification that Y has arrived at the particular location, the process of camping on a location is completed.

Figure 1B:
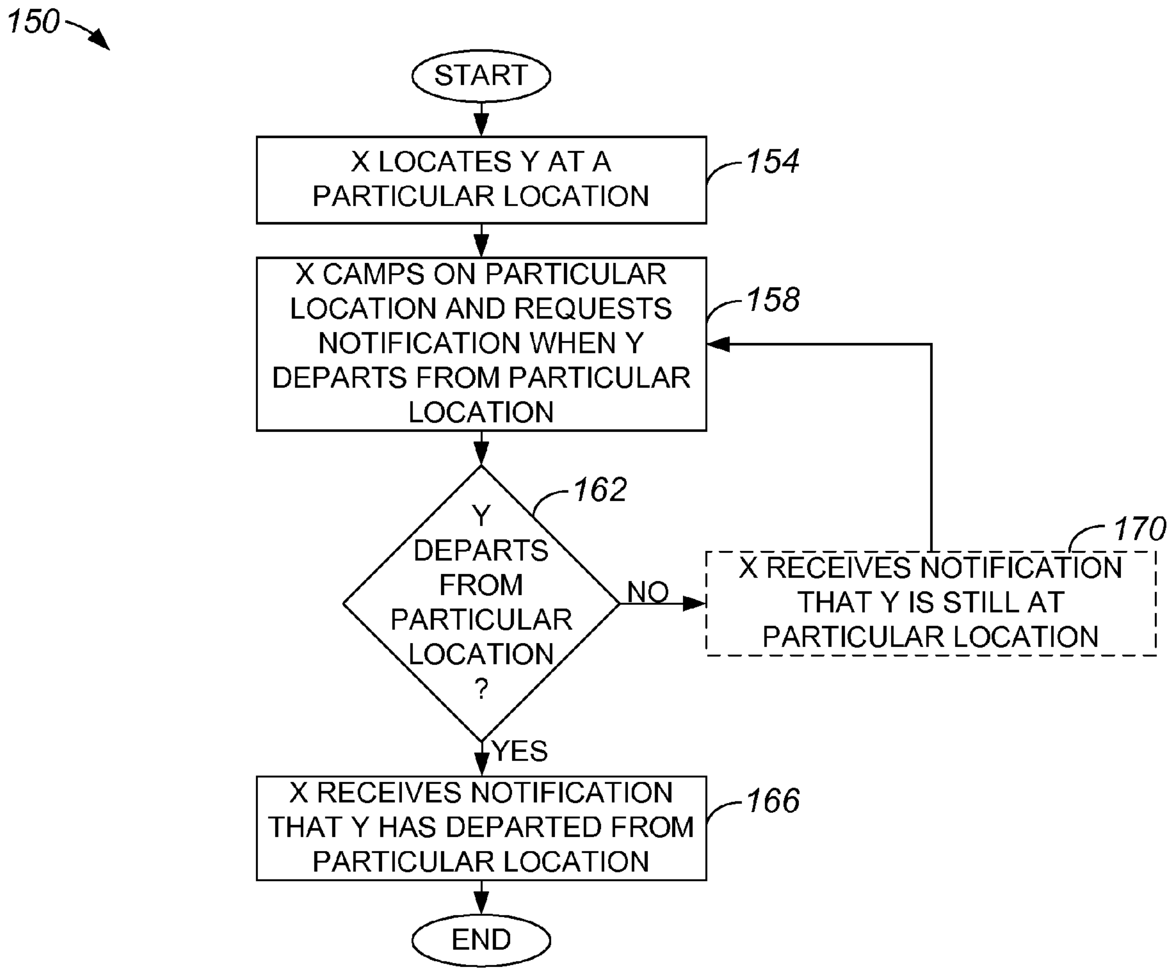
FIG. 1B is a process flow diagram which illustrates a method of camping on a location for a departure from the location in accordance with an embodiment of the present invention.

In lieu of camping on a location for a notification that a first party has arrived at a particular location, a camping party may camp on a location for a notification of other events associated with the first party and the particular location. By way of example, a camping party may camp on a location for a notification that a particular party has left or departed from the location. FIG. 1B is a process flow diagram which illustrates a method of camping on a location for a departure from the location in accordance with an embodiment of the present invention. A process 150 of camping on a location for notification of a departure begins at step 154 in which a party, e.g., party X, locates another party, e.g., party Y, at a particular location. In general, X may locate Y at the particular location manually, or through the use of a camping application, as described above with respect to FIG. 1A. X camps on the particular location in step 158, and requests notification when Y departs from the particular location.

It is determined in step 162 whether Y has departed from the particular location. In one embodiment, a camping application may receive notification via a sensor at the particular location that Y is no longer sensed at the particular location. If it is determined that Y has not departed from the particular location, X may optionally receive a notification from the camping application in step 162 that Y is still located at the particular location. Whether or not X receives notification that Y is still present at the particular location, process flow returns to step 158 in which X continues to camp on the particular location.

Returning to step 162, if it is determined that Y has departed from the particular location, then the camping application notifies X in step 166 that Y has departed from the particular location. Once X receives notification that Y has departed from the particular location, the process of camping on the particular location for notification of a departure is completed.

Figure 2:
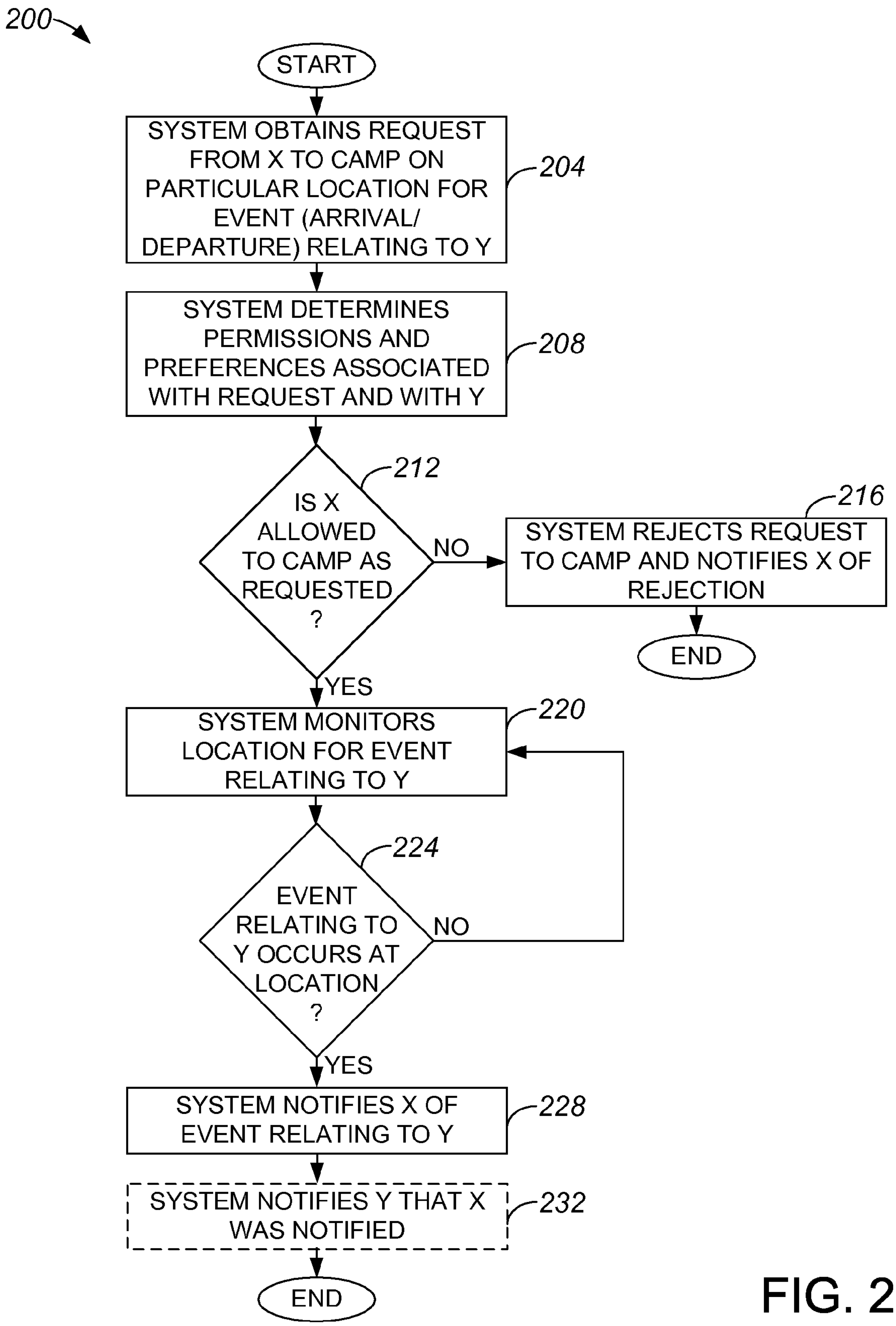
FIG. 2 is a process flow diagram which illustrates a method of operating a system which allows camping on a location in accordance with an embodiment of the present invention.

The operation of a system, e.g., a system associated with a camping application, that enables X to camp on a location for notification of an event relating to Y includes processing requests to camp on the location and monitoring the location. Referring next to FIG. 2, the operation of a system that enables camping on location will be described in accordance with an embodiment of the present invention. A process 200 of operating a system that supports camping on a location begins at step 204 in which the system obtains a request from X to camp on a particular location for notification regarding an event relating to Y. By way of example, the system may receive a request from X for notification regarding an event such as an arrival of Y at a particular location or a departure of Y from the particular location.

In step 208, the system determines the permissions and preferences associated with the request, as well as the permissions and preferences associated with Y. For instance, when X specifies a request using a user interface, X may specify the particular location, an event for which notification is desired, and/or a method of notification. It should be appreciated that the system may have default permissions and preferences that may be implemented in the absence of specific permissions and preferences specified by X. Both X and Y may specify permissions and preferences. Y may specify whether or not X is allowed to camp on a location for notifications relating to Y After the system determines permissions and preferences, the system determines in step 212 whether X is allowed to camp as requested. That is, it is determined in step 212 if X is allowed to receive notifications relating to Y. If it is determined that X is not allowed to receive notifications relating to Y, the system rejects the request to camp in step 216, and notifies X accordingly. In other words, the system rejects the request. Once X is notified that the request is denied, the process of operating a system that supports camping on a location is terminated.

Alternatively, if it is determined in step 212 that X is allowed to camp as requested, then the system effectively accepts the request to camp. Accordingly, in step 220, the system monitors the location for the requested event relating to Y. Monitoring the location may include interfacing with a sensor and/or a location device associated with the location. In one embodiment, monitoring the location may involve polling the location and/or receiving information updates from the location, e.g., information updates that identify parties which are currently at the location.

A determination is made in step 220 as to whether the desired event relating to Y has occurred. If it is determined that the desired event has not occurred, process flow returns to step 220 in which the system continues to monitor the location. On the other hand, if it is determined that the event relating to Y has occurred, the system notifies X in step 228 that the event has occurred. Optionally, the system may also notify Y that X has been notified of the event in step 232. After the system notifies X of the event and, optionally, notifies Y that X was notified, the process of operating a system that supports camping on a location is completed.

Figure 3A:
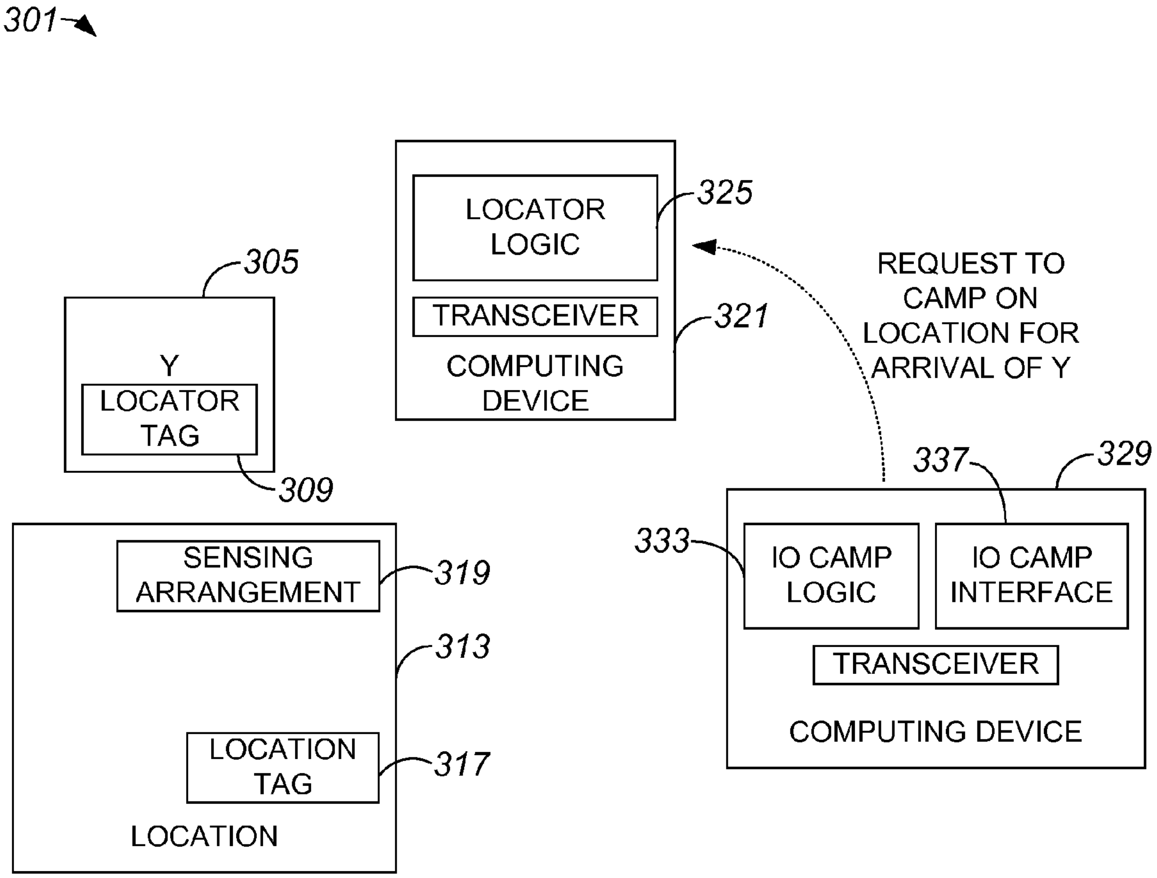
FIG. 3A is a block diagram of an overall system which supports camp on location in accordance with an embodiment of the present invention.

A system which supports camping on a location is generally implemented within a network environment. FIG. 3A is a block diagram of one overall system which supports camping on a location in accordance with an embodiment of the present invention. An overall system 301 includes a location 313 that is monitored by a computing device 321. Location 313 may include a location tag 317 that identifies location 317 to computing device 321, and a sensing arrangement 319 that is arranged to effectively identify any parties which are present at location 313, as for example by identifying whether the status of any parties have changed relative to location 313. Computing device 321 generally includes locator logic 325 that may cooperate with sensing arrangement 319 to determine when to send notifications regarding the presence of parties at location 313. Locator logic 325, which may include software logic embodied in a tangible medium and/or hardware logic, also accepts requests to camp on location 313. It should be appreciated that although computing device 321 is shown as being remote relative to location 313, computing device 321 may instead be located at location 313.

A computing device 329 includes camp logic 333 and a camp interface 337. Camp logic 333 and camp interface 337 are arranged to cooperate to allow a request to camp on location 313 to be sent to locator logic 325. Camp logic 333 and locator logic 325 are generally associated with an application that implements camp on location functionality. Camp interface 337 may be a graphical user interface (GUI) that may be used to select a parties and locations to camp on, as well as to select a method of notification.

In the described embodiment, computing device 329 may be used to send a request to computing device 321 or, more specifically, locator logic 325, to camp on location 313 for the arrival of a party Y 305. When locator logic 325 obtains information associated with such a request, locator logic 325 effectively monitors location 313 using sensing arrangement 319 to determine when a locator tag 309 associated with Y 305 is sensed at location 313. Locator logic 325 may effectively request or otherwise ask that sensing arrangement 319 provide locator logic 325 with an indication when Y 305 has arrived at location 313.

A locator tag 309 is substantially any device or component which allows a physical location of Y 305 to be identified. Locator tag 309 may be an RFID tag, for instance. In one embodiment, locator tag 309 may be a device such as a cellular telephone, a global positioning system (GPS) receiver or transmitter, or a computing device. When such a device is sensed as being at location 317, Y 305 may generally be assumed as being at location 313.

Figure 3B:
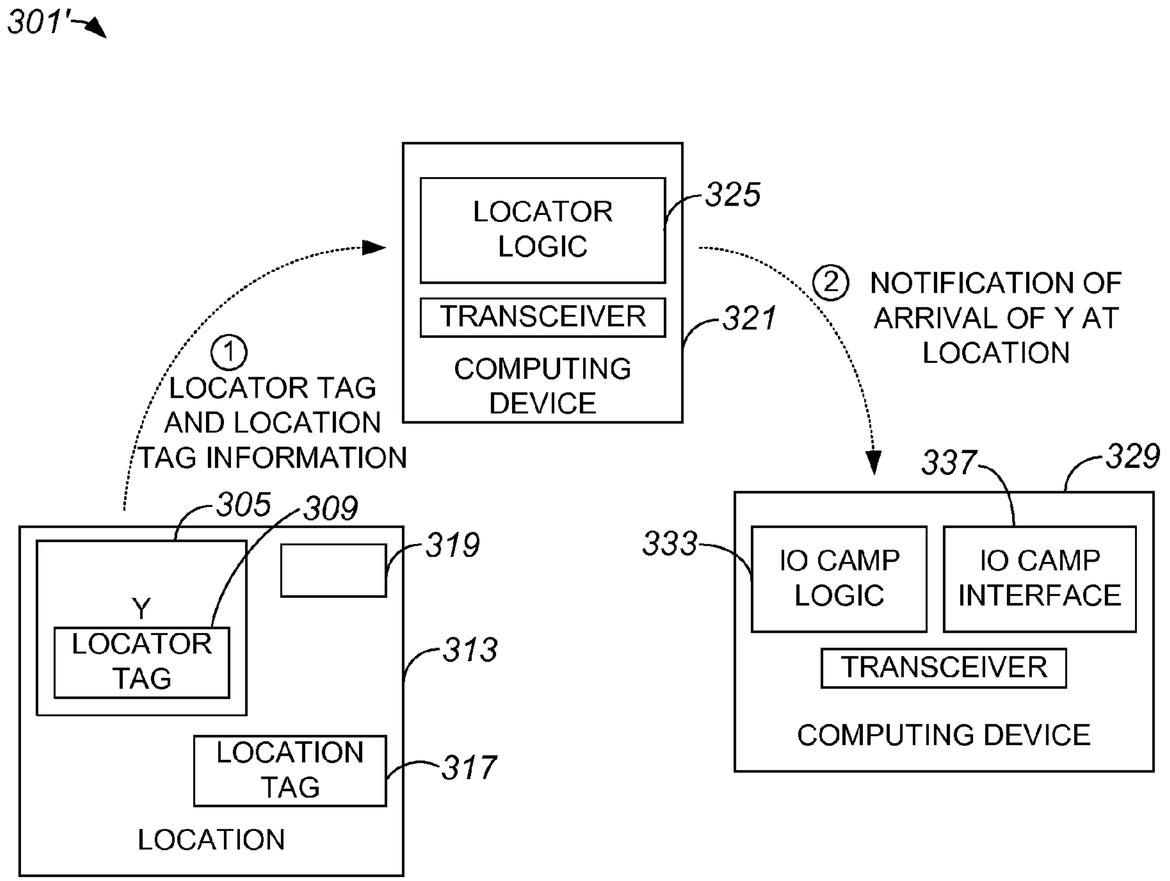
FIG. 3B is a block diagram of an overall system, e.g., system 301 of FIG. 3A, in which an event occurs and a camper is notified of the event in accordance with an embodiment of the present invention.

When Y 305 enters or otherwise transitions into location 313, sensing arrangement 319 senses that locator tag 309 is present at location 313. As shown in FIG. 3B, sensing arrangement 319 may then provide locator logic 325 with an indication that Y 305 is located at location 313. The indication may be provided in a variety of different formats. By way of example, the indication may be provided in a data signal that includes, but is not limited to, information relating to locator tag 309 and location tag 317. Using information provided by sensing arrangement 319, locator logic 325 may cause a notification to be sent to computing device 329 that indicates that Y 305 is present at location 313.

Figure 4:
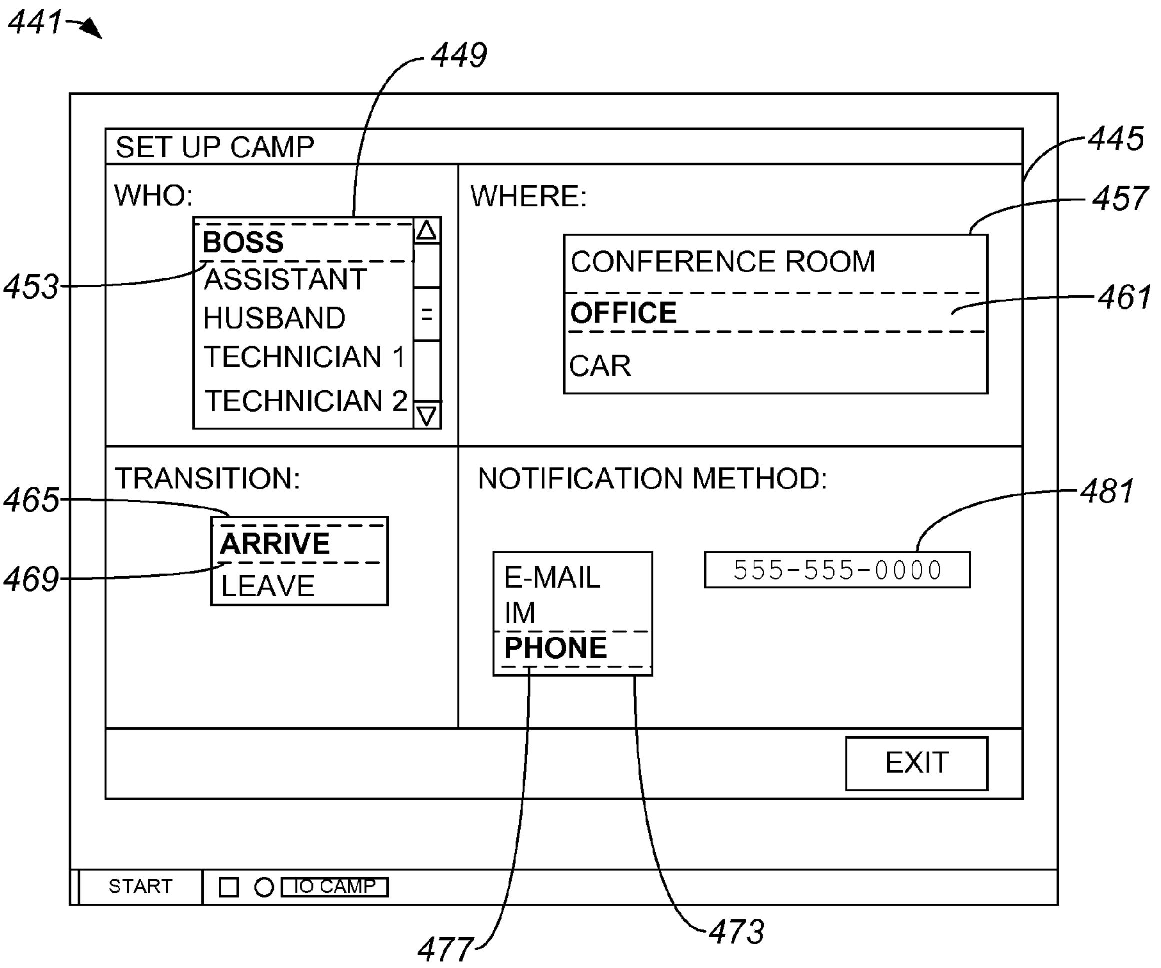
FIG. 4 is a diagrammatic representation of a display of a user interface that enables a camp on a location to be implemented in accordance with an embodiment of the present invention.

When a user or camper requests a camp on a location, the user may be presented with a user interface that allows the request to be specified. With reference to FIG. 4, one user interface that may be used to specify a request to camp on a location will be described in accordance with an embodiment of the present invention. A display 441, e.g., a computer monitor or a display screen of a computing device, includes an interactive user interface window 445. Window 445 includes a plurality of fields which a user may use to select and/or specifies elements of a request to camp. It should be appreciated that the fields and the methods used to specify information for the fields may vary widely.

Fields in window 445 includes a field 449 that allows a party 453 to be selected and a field 457 that allows a location 457 to be selected. In the described embodiment, possible locations to monitor that a presented in field 457 are dependent upon the field selected in field 449. That is, locations displayed in field 457 may be based on locations at which selected party 453 may be expected to be. As shown, the presence of party 453 at a location 461 is to be monitored. A desired transition, e.g., an arrival or a departure, is displayed in a field 465, and a desired method of notification is displayed in a field 473. As shown, an arrival transition 465 is selected, and a phone notification 477 is selected as a notification method. Because phone notification 477 is selected, a telephone number may be specified in a field 481. Hence, when party 453 arrives at location 461, a notification will effectively be provided by calling the telephone number specified in field 481.

Figure 5:
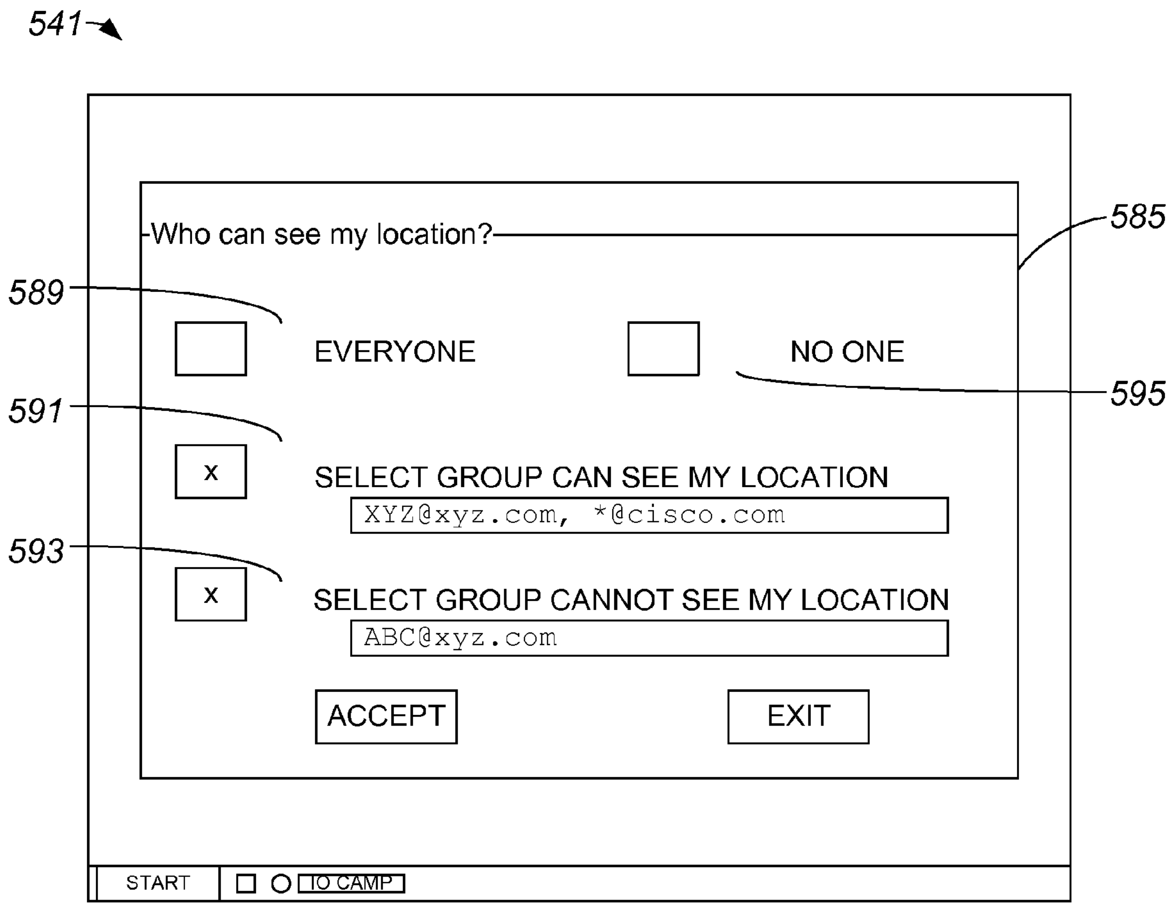
FIG. 5 is a diagrammatic representation of a display of a user interface that enables preferences relating to visibility to be specified in a system that supports camping on a location in accordance with an embodiment of the present invention.

Whether or not a user or a camper may be allowed to camp on a location for an event associated with a first party depends, in one embodiment, on whether the first party has allowed the user permission to request a camp. In other words, a user may effectively access an application that allows camping on a location to specify permissions. FIG. 5 is a diagrammatic representation of a user interface that may be used to specify permissions associated with a camp on location application in accordance with an embodiment of the present invention. A display 541 includes a user interface window 585 that allows a party to effectively specify who, if anyone, is allowed to camp on a location for his or her presence.

It should be appreciated that a "default" condition may be in effect if a party does not specify parties who are allowed to camp on a location for his or her presence. A default condition is typically a condition in which either everyone with access to an application that allows camping on a location is allowed to camp on a location for the presence of the party, or nobody with access to the application is allowed to camp on a location for the presence of the party.

A party may proactively make a selection 589 that allows substantially everyone with access to an application that allows camp on a location to camp on a location for his or her presence, or a selection 595 that effectively allows nobody to camp on a location for his or her presence. A selection 591 allows a party to specify parties that are allowed to camp on a location for his or her presence. As shown, the parties that are allowed to camp on a location may be specified using e-mail addresses. However, it should be understood that substantially any identifying information, e.g., given names, for the parties may be specified. A selection 593 allows a party to specify parties that are not allowed to camp on a location for his or her presence.

Although only a few embodiments of the present invention have been described, it should be understood that the present invention may be embodied in many other specific forms without departing from the spirit or the scope of the present invention. By way of example, methods and mechanisms used to specify information relating to a request may vary widely. While a user interface that includes scrollable menus and text input fields has been described as being suitable for allowing a request to be specified, other user interfaces may be suitable. Other suitable user interfaces may include, but are not limited to including, a series of text input fields, a plurality of pull-down or pop-up menus, and a wizard application which prompts a user to specify inputs. In one embodiment, a user interface may be a voice interface that may enable a request to be specified using a telephone.

A variety of different methods may be used to sense the location of a party at a location. That is, a location tracking system may be substantially any system that effectively provides live tracking of a device or a party that is in possession of the device. The sensing of a location of a party may include, but is not limited to including, determining when an RFID tag of the party, a cellular phone of the party, and/or a laptop computer possessed by the party is present at the location, as previously mentioned. It should be appreciated, however, that substantially any suitable method may be used to sense the location of a party at a location. By way of example, if the location is an office assigned to the party, the use of a telephone in the office may be an indication that the party is present at the location. The use of a computer in the office may also be considered to be an indication that the party is present at the location. In one embodiment, a sensor that turns lights on and off in an office when someone enters or leaves, respectively, the office may be an indication that a party has either entered or left the office. In another embodiment, a heat sensor may be used to provide an indication of whether a party is present at a location.

Triangulation may also be used to determine the location of a party without departing from the spirit or the scope of the present invention. For instance, GPS techniques may be used to ascertain the location of a party. Once the location of the party is determined, it may be determined if the party is actually present at a particular location that is being camped on by another party.

In general, a system may enable camping on a location until a requester or camper proactively rescinds the request. That is, a system may camp on a location in response to a request until the request is rescinded. Alternatively, a system may camp on a location in response to a request until the request times out, e.g., expires, or until the requester is no longer active, e.g., a requester has logged out of the computing system used to submit the request. A system may allow a preference to be set by an administrator or by a user that indicates how long a request is to remain active and, hence, how long a camp on a location is to last. If the object of the request, e.g., the arrival of a party at a location, has not occurred before the request times out, a notification may be sent to the requester that his or her request has timed out. It should be appreciated that, typically, when the object of a request occurs, the request is effectively considered fulfilled and is deactivated.

In one embodiment, an overall system may be arranged such that an indication that a party has arrived at or departed from a location is substantially only provided to a locator, e.g., a locator on a device of the system that sends out a notification that the party has arrived at or departed from the location, if a notification is to be sent. That is, unless a requester has requested notification regarding an event relating to a party and a location, substantially no indication of the event is recorded or otherwise provided to a locator. However, it should be appreciated that in some embodiments, indications regarding events at a location may be substantially automatically provided to a locator such that the locator may process the indications to determine if any requests for notification regarding any of the events are effectively active.

Logic and/or a mechanism that allows camping on a location may generally be implemented on any suitable system, as described above. In one embodiment, a suitable system may be a phone, e.g., a Cisco IP phone available commercially from Cisco Systems, Inc. of San Jose, Calif. That is, camp logic and a camp interface may be provided on a networked phone.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:

obtaining a request for a notification regarding an event associated with a first party and a first location, the request being received from a second party, the request being arranged to expire;

determining whether the second party is permitted to receive the notification regarding the event;

determining, using logic associated with a computing device, whether the event has occurred before the request has expired, wherein determining whether the event has occurred includes determining if a sensing device associated with the location has identified a change in status associated with the first party relative to the location;

sending the notification regarding the event if the event has occurred before the request has expired and the second party is permitted to receive the notification regarding the event, wherein sending the notification regarding the event includes sending the notification to the second party using the logic associated with the computing device;

determining if the request has expired; and sending an indication to the second party if the request has expired, the indication being arranged to indicate that the request has expired.

2. The method of claim 1 wherein the event is one selected from the group including a change in usage of a device located at the first location, a change in presence of a cellular phone of the first party with respect to the first location, and a change in presence of a computer apparatus of the first party with respect to the first location.

3. The method of claim 1 wherein determining whether the second party is permitted to receive the notification regarding the event includes determining if the first party has granted the second party permission to monitor the first party.

4. The method of claim 1 wherein the sensing device is an RFID sensing device and the first party is associated with an RFID tag, and wherein it is determined that the sensing device associated with the location has identified a change in status associated with the first party relative to the location when the RFID sensing device detects a change with respect to the presence of the RFID tag.

5. The method of claim 1 wherein the sensing device is one selected from a group including a heat sensor and a light sensor.

6. The method of claim 1 further including:

deactivating the request after sending the notification regarding the event if the event has occurred and the second party is permitted to receive the notification regarding the event.

7. The method of claim 1 wherein the event is an arrival of the first party at the first location.

8. The method of claim 1 wherein the event is a departure of the first party from the first location.

9. A method comprising:

obtaining a request for a notification regarding an event associated with a first party and a first location, the request being received from a second party, wherein the request for the notification regarding the event includes a format for sending the notification regarding the event, the format for sending the notification regarding the event including one selected from the group including an e-mail message, a telephone message, and an instant message;

determining whether the second party has permission to receive the notification regarding the event, wherein the permission is specified by the first party;

determining, using logic associated with a computing device, whether the event has occurred includes determining if a sensing device associated with the location has identified a change in status associated with the first party relative to the location; and sending the notification regarding the event if the event has occurred and the second party has permission to receive the notification regarding the event, wherein sending the notification regarding the event includes sending the notification to the second party using the logic associated with the computing device.

10. Logic encoded in one or more non-transitory tangible media for execution and when executed operable to:

obtain a request for a notification regarding an event associated with a first party and a first location, the request being received from a second party, the request being arranged to expire;

determine whether the second party is permitted to receive the notification regarding the event;

determine whether the event has occurred before the request has expired includes to determine if a sensing device associated with the location has identified a change in status associated with the first party relative to the location;

send the notification regarding the event if the event has occurred before the request has expired and the second party is permitted to receive the notification regarding the event, wherein the logic operable to send the notification regarding the event includes logic operable to send the notification to the second party;

determine if the request has expired; and send an indication to the second party if the request has expired, the indication being arranged to indicate that the request has expired.

11. The logic of claim 10 operable to determine if the sensing device associated with the location has identified the change in the status associated with the first party relative to the location includes logic operable to receive information from the location that identifies the change in the status.

12. The logic of claim 10 wherein the event is one selected from the group including an arrival at the location and a departure from the location.

13. The logic of claim 10 wherein the logic operable to determine whether the second party is permitted to receive the notification regarding the event is operable to determine if the first party has granted the second party permission to monitor the first party.

14. The logic of claim 10 wherein the request for the notification regarding the event includes a format for sending the notification regarding the event, the format for sending the notification regarding the event including one selected from the group including an e-mail message, a telephone message, and an instant message.

15. An apparatus comprising:

a receiver, the receiver being arranged to obtain a request for notification regarding an event associated with a first location, the receiver further being arranged to receive an indication from the first location, wherein the indication is arranged to indicate that the event has occurred;

locator logic, the locator logic being arranged to process the request, the locator logic further being arranged to process the indication, wherein the locator logic is arranged to determine whether the notification regarding the event is to be sent in response to the request; and a transmitter, the transmitter being arranged to provide the notification regarding the event if it is determined that the notification regarding the event is to be sent in response to the request;

wherein the request is obtained from a first party and the event is associated with the first location and a second party, the receiver being arranged to receive the indication from a sensing arrangement associated with the first location when the event associated with the second party relative to the first location is detected by the sensing arrangement, wherein the locator logic further being arranged to determine whether the notification regarding the event is to be sent in response to the request by determining if the first party has permission to receive the notification regarding the event, and the permission is specified by the second party.

16. The apparatus of claim 15 wherein the transmitter is arranged to provide the notification by one selected from the group including causing an e-mail to be sent to the first party, causing a call to be made to the first party, and causing an instant message to be transmitted to the first party.

17. The apparatus of claim 16 wherein the request specifies how the notification is to be provided.

18. The apparatus of claim 15 wherein the event is one selected from the group including an arrival of the second party at the first location and a departure of the second party from the location.

19. The apparatus of claim 15 wherein the locator logic is arranged to provide the first location with information that indicates that a sensing arrangement at the first location is to monitor the first location for an occurrence of the event.

20. The apparatus of claim 15 wherein the request for notification regarding the event associated with the first location is a request to camp on the first location for one selected from the group including an arrival at the first location and a departure from the first location.

21. An apparatus comprising:

means for obtaining a request for a notification regarding an event associated with a first party and a first location, the request being received from a second party, the request being arranged to expire;

means for determining whether the second party is permitted to receive the notification regarding the event;

means for determining whether the event has occurred before the request has expired, wherein determining whether the event has occurred includes determining if a sensing device associated with the location has identified a change in status associated with the first party relative to the location;

means for sending the notification regarding the event if the event has occurred before the request has expired and the second party is permitted to receive the notification regarding the event, wherein the means for sending the notification regarding the event includes means for sending the notification to the second party;

means for determining if the request has expired; and means for sending an indication to the second party if the request has expired, the indication being arranged to indicate that the request has expired.

* * * * *